(12) United States Patent
Needham et al.

(10) Patent No.: US 9,488,479 B2
(45) Date of Patent: Nov. 8, 2016

(54) METHOD, SYSTEM, AND DEVICE FOR TO-DO-LIST BASED NAVIGATION

(75) Inventors: Brad H. Needham, North Plains, OR (US); Robin L. Jordan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,312

(22) PCT Filed: Dec. 27, 2011

(86) PCT No.: PCT/US2011/067383
§ 371 (c)(1),
(2), (4) Date: Jun. 28, 2013

(87) PCT Pub. No.: WO2013/100902
PCT Pub. Date: Jul. 4, 2013

(65) Prior Publication Data
US 2014/0046590 A1    Feb. 13, 2014

(51) Int. Cl.
*G06F 19/00*    (2011.01)
*G01C 21/00*    (2006.01)
*G01C 21/36*    (2006.01)
(Continued)

(52) U.S. Cl.
CPC .............. *G01C 21/00* (2013.01); *G01C 21/343* (2013.01); *G01C 21/36* (2013.01); *G01C 21/362* (2013.01); *G06Q 10/109* (2013.01)

(58) Field of Classification Search
CPC .... G01C 21/00; G01C 21/36; G01C 21/343; G01C 214/362; G06F 3/048
USPC ........... 701/467, 29.1, 204, 423, 522; 705/1; 246/1; 709/228
See application file for complete search history.

(56) References Cited

U.S. PATENT DOCUMENTS

2002/0030698 A1    3/2002    Baur et al.
2002/0082771 A1*   6/2002    Anderson .......... G01C 21/3484
                                                         701/423
(Continued)

FOREIGN PATENT DOCUMENTS

CN    101556658 A    10/2009
EP     1909069 A1     4/2008
(Continued)

OTHER PUBLICATIONS

International Search Report and Written Opinion received for International Patent Application No. PCT/US2011/067383, mailed Jun. 28, 2012, 10 pages.

(Continued)

*Primary Examiner* — Mahmoud Ismail
(74) *Attorney, Agent, or Firm* — Barnes & Thornburg LLP

(57) ABSTRACT

A method, system, and device for to-do-list based navigation includes identifying a selection of tasks to be completed from the to-do-list. The selected tasks may be prioritized or ordered based on navigation data and context data associated with each of the selected tasks to develop a trip plan for completing the selected tasks. The context data may include attributes, such as constraint data, associated with one or more of the selected tasks. In some embodiments, a status update for the current task may be periodically or occasionally communicated to one or more mobile computing devices to inform a user of the mobile computing device of the status of completion of the current task.

24 Claims, 8 Drawing Sheets

(51) Int. Cl.
*G01C 21/34* (2006.01)
*G06Q 10/10* (2012.01)
*G06F 7/00* (2006.01)
*G06F 11/30* (2006.01)
*G06F 15/16* (2006.01)

(56) References Cited

U.S. PATENT DOCUMENTS

| | | | |
|---|---|---|---|
| 2004/0230685 A1 | 11/2004 | Seligmann | |
| 2007/0138347 A1* | 6/2007 | Ehlers | 246/1 R |
| 2008/0046283 A1* | 2/2008 | Graves | 705/1 |
| 2009/0105947 A1 | 4/2009 | Nachesa et al. | |
| 2009/0210148 A1 | 8/2009 | Jayanthi | |
| 2011/0257881 A1* | 10/2011 | Chen et al. | 701/204 |
| 2012/0209468 A1* | 8/2012 | Thomas | 701/29.1 |
| 2014/0107920 A1* | 4/2014 | Jayanthi | 701/467 |

FOREIGN PATENT DOCUMENTS

| | | |
|---|---|---|
| EP | 1909069 B1 | 8/2010 |
| JP | 08-075493 | 3/1996 |
| JP | 2000-146617 | 5/2000 |
| JP | 2001-141478 | 5/2001 |
| JP | 2002083393 A | 3/2002 |
| JP | 2004-227497 | 8/2004 |
| JP | 2008-309636 | 12/2008 |
| JP | 2009-048274 | 3/2009 |
| JP | 2009-130758 | 6/2009 |
| JP | 2011-163777 | 8/2011 |
| KR | 1020060037494 A | 3/2006 |
| KR | 1020090065856 A | 6/2009 |
| KR | 1020100045296 A | 5/2010 |
| KR | 1020110052386 A | 5/2011 |
| TW | 200538750 A | 12/2005 |
| TW | 200705304 A | 2/2007 |
| TW | 200939060 A | 9/2009 |
| TW | 201040498 A | 11/2010 |
| WO | 2013100902 A1 | 7/2013 |

OTHER PUBLICATIONS

Newman et al., "PEPYS: Generating Autobiographies by Automatic Tracking," ECSCW '91, Proceedings of the Second European Conference on Computer-Supported Cooperative Work, Sep. 25-27, 1991, pp. 175-185.
Office Action received for Taiwanese Patent Application No. 101149604, mailed May 1, 2014, 33 pages of Office Action including 15 pages of unofficial English translation.
Decision of Rejection and English Translation for Taiwan Patent Application No. 101149604, dated Dec. 17, 2014, 6 pages.
Supplementary European Search Report for Patent Application No. 11878978.3-1557/2798305, dated Jan. 12, 2016, 10 pages.
Office Action and English Translation for Japanese Patent Application No. 2014-545877, dated Jan. 5, 2016, 10 pages.
Office Action and English Translation for Japanese Patent Application No. 2014-545877, dated Jun. 2, 2015, 9 pages.
Office Action and English Translation for Taiwan Patent Application No. 101149604, dated Jan. 22, 2016, 8 pages.
Notice of Preliminary Rejection and English Translation for Korean Patent Application No. 2014-7017746, dated Aug. 5, 2015, 13 pages.
Examiner's Report for Canadian Application No. 2860461, dated Mar. 17, 2016, 4 pages.
Final Rejection for Korean Patent Application No. 2014-7017746, dated Apr. 1, 2016, 7 pages.
Chinese Office Action for Application No. 201180076065.9, dated Aug. 17, 2016, 12 pages.

\* cited by examiner

METHOD, SYSTEM, AND DEVICE FOR TO-DO-LIST BASED NAVIGATION

BACKGROUND

In-vehicle navigation systems provide visual navigation to a driver of the vehicle based on a destination location. To do so, a typical in-vehicle navigation system includes a global positioning system (GPS) navigation device to determine a current location of the vehicle. Additionally, the in-vehicle navigation system maintains a roadmap database stored on the system. The roadmap may be displayed to the driver of the vehicle and the current location of the vehicle may be visually indicated on the roadmap. The in-vehicle navigation system may use the roadmap database to calculate a path from the current location to the destination location and provide additional navigation during the trip.

To-do-lists are created and maintained by individuals to keep track of various tasks the individual desires to complete. In the past, to-do-lists were physically maintained by the individual using a physical media such as paper, notes, dry erase boards, and the like. However, nowadays, many consumer devices include functionality for the creation and maintenance of personal, digital to-do-lists. The digital to-do-lists allow the user to manually track his/her progress of completing the tasks from the listed to-do-list.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
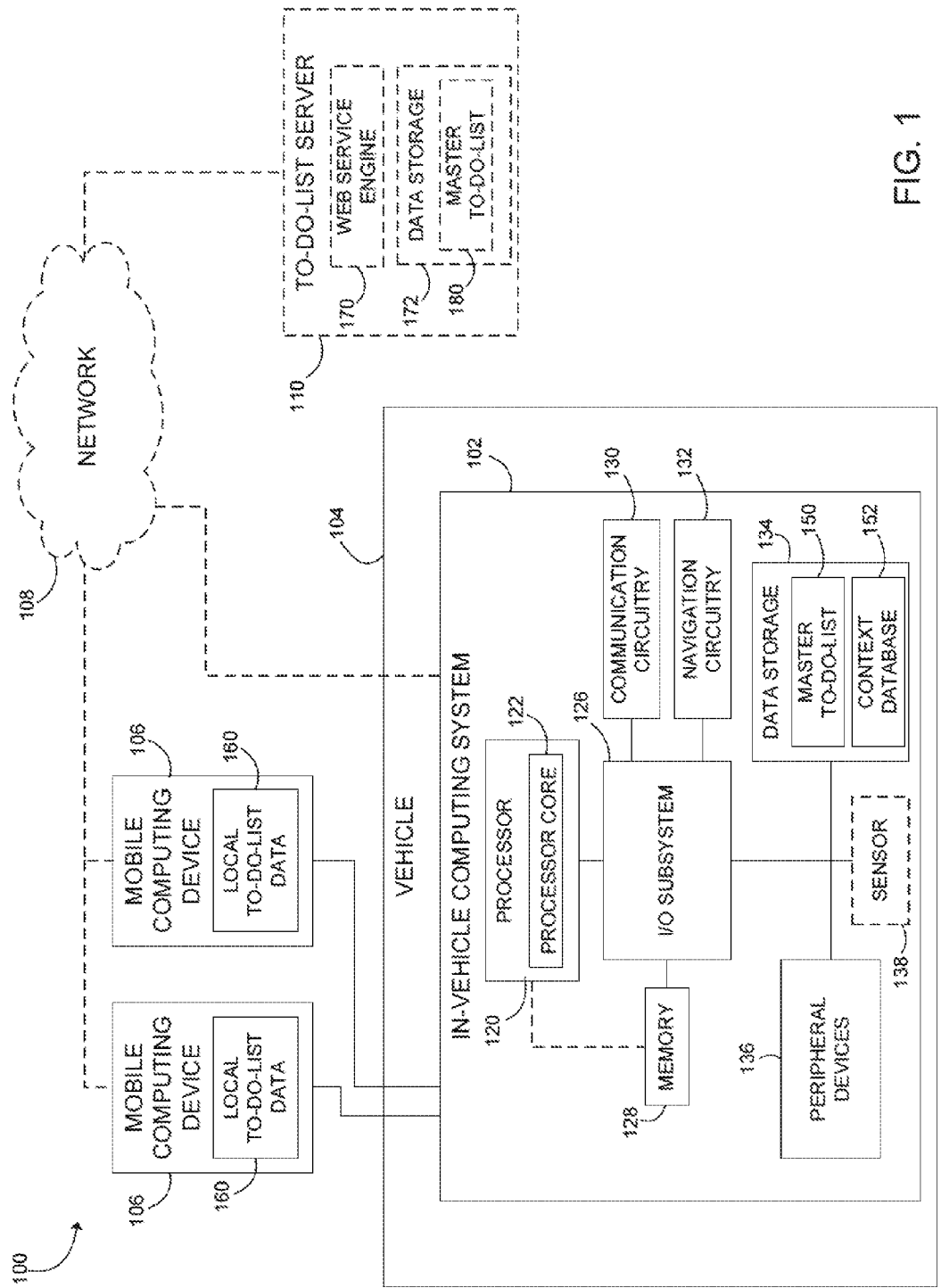
FIG. 1 is a simplified block diagram of at least one embodiment of a system for providing to-do-list based navigation.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, a system 100 for providing to-do-list based navigation includes an in-vehicle computing system 102 incorporated or otherwise located in a vehicle 104 and one or more mobile computing devices 106. Additionally, in some embodiments, the system 100 may include a to-do-list server 110 with which the in-vehicle computing system 102 and/or the mobile computing devices 106 may communicate over a network 108. In use, as discussed in more detail below, the in-vehicle computing system 102 provides navigation to a driver of the vehicle 104 based on one or more tasks selected from a to-do-list maintained by the in-vehicle computing system 102. That is, rather than being based solely on a desired destination location, the navigation provided by the in-vehicle computing system 102 is based on the selected tasks that are to be completed. As such, the in-vehicle computing system 102 may prioritize or otherwise order the tasks based on the destination location of the tasks, context data associated with the tasks, and/or other criteria. The prioritization of tasks may be determined so as to reduce the overall drive time required to complete the selected tasks, reduce the total distance traveled for completing the tasks, and/or satisfy certain constraints of the context data (e.g., the context data may indicate that the task must be completed by a certain date or within a certain time period).

While the in-vehicle computing system 102 maintains a "master" to-do-list, the individual tasks that are included in the master to-do-list may be entered via the in-vehicle computing system 102 or via the mobile computing devices 106. That is, each of the mobile computing devices 106 may maintain a local to-do-list including tasks that may be periodically or responsively synchronized with the to-do-list maintained by the in-vehicle computing system 102 either directly, over the network 108, or via the to-do-list server 110 as discussed in more detail below. Additionally, during use, the in-vehicle computing system 102 may communicate with one or more of the mobile computing devices 106 to provide status updates regarding the progress of completion of a current task, to negotiate a rendezvous point, and/or to facilitate other functionality as discussed in more detail below.

The in-vehicle computing system 102 may be embodied as any type of vehicle computing system capable of performing the functions described herein. For example, the in-vehicle computing system 102 may be embodied as an in-vehicle navigation system, a stand-alone navigation system, an in-vehicle infotainment system, or a portion thereof. In the illustrative embodiment of FIG. 1, the in-vehicle computing system 102 includes a processor 120, an I/O subsystem 126, a memory 128, communication circuitry 130, navigation circuitry 132, data storage 134, and one or more peripheral devices 136. In some embodiments, several of the foregoing components may be incorporated on a motherboard of the in-vehicle computing system 102, while other components may be communicatively coupled to the motherboard via, for example, a peripheral port. Furthermore, it should be appreciated that the in-vehicle computing system 102 may include other components, sub-components, and devices commonly found in a computer and/or navigation system, which are not illustrated in FIG. 1 for clarity of the description.

The processor 120 of the in-vehicle computing system 102 may be embodied as any type of processor capable of executing software/firmware, such as a microprocessor, digital signal processor, microcontroller, or the like. The processor 120 is illustratively embodied as a single core processor having a processor core 122. However, in other embodiments, the processor 120 may be embodied as a multi-core processor having multiple processor cores 122. Additionally, the in-vehicle computing system 102 may include additional processors 120 having one or more processor cores 122.

The I/O subsystem 126 of the in-vehicle computing system 102 may be embodied as circuitry and/or components to facilitate input/output operations with the processor 120 and/or other components of the in-vehicle computing system 102. In some embodiments, the I/O subsystem 126 may be embodied as a memory controller hub (MCH or "northbridge"), an input/output controller hub (ICH or "southbridge"), and a firmware device. In such embodiments, the firmware device of the I/O subsystem 126 may be embodied as a memory device for storing Basic Input/Output System (BIOS) data and/or instructions and/or other information (e.g., a BIOS driver used during booting of the in-vehicle computing system 102). However, in other embodiments, I/O subsystems having other configurations may be used. For example, in some embodiments, the I/O subsystem 126 may be embodied as a platform controller hub (PCH). In such embodiments, the memory controller hub (MCH) may be incorporated in or otherwise associated with the processor 120, and the processor 120 may communicate directly with the memory 128 (as shown by the hashed line in FIG. 1). Additionally, in other embodiments, the I/O subsystem 126 may form a portion of a system-on-a-chip (SoC) and be incorporated, along with the processor 120 and other components of the in-vehicle computing system 102, on a single integrated circuit chip.

The processor 120 is communicatively coupled to the I/O subsystem 126 via a number of signal paths. These signal paths (and other signal paths illustrated in FIG. 1) may be embodied as any type of signal paths capable of facilitating communication between the components of the in-vehicle computing system 102. For example, the signal paths may be embodied as any number of wires, cables, light guides, printed circuit board traces, via, bus, intervening devices, point-to-point interconnects, and/or the like.

The memory 128 of the in-vehicle computing system 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 128 is communicatively coupled to the I/O subsystem 126 via a number of signal paths. Although only a single memory device 128 is illustrated in FIG. 1, the in-vehicle computing system 102 may include additional memory devices in other embodiments. Various data and software may be stored in the memory device 128. For example, one or more operating systems, applications, programs, libraries, and drivers that make up the software stack executed by the processor 120 may reside in memory 128 during execution.

A master to-do-list 150 is stored and maintained in the data storage device 134. As discussed above, the master to-do-list 150 comprises a plurality of tasks that are to be completed by a driver or a passenger of the vehicle 104. The tasks may be embodied as any type of activity that may be completed by the driver or a passenger of the vehicle 104. Typically, such tasks include a destination location, which may be embodied as a specific or general location. For example, the tasks may include "pick up child at the Town High School," "pick up milk from the store". "drop off laundry at cleaners," and/or other tasks. Each task may include additional context data associated with the task. Such context data may define one or more attributes associated with the task itself or the destination location. For example, the context data may include constraint data that identifies a due date by which an associated task must be completed (e.g., "pick up laundry by Wednesday"), a time window in which the associated task must be completed (e.g., "drop off laundry at cleaners between 1:00 PM and 3:00 PM"), or other constraints or requirements associated with the task (e.g., the context data may identify the requirement to return home after a visit to the store to allow the driver to place the store goods in a refrigerator). Additionally or alternatively, the context data may define constraint data associated with the destination location (e.g. "enter school parking lot from the north entrance only"). The context data may be manually entered with the task itself by the user/drive and/or inferred or learned over time by the in-vehicle computing system 102. For example, if a task does not specify a particular destination (e.g., "pick up milk at store"), the in-vehicle computing system 102 may infer or otherwise identify a particular store location based on past visits, the location of the store relative to the driver's home or destination locations of other tasks, etc.

The communication circuitry 130 of the in-vehicle computing system 102 may include any number of devices and circuitry for enabling communications between the in-vehicle computing system 102 and the mobile computing devices 106. The communication circuitry 130 and the mobile computing devices 106 may use any suitable communication protocol to directly communicate data between each other such as, for example, Bluetooth®, Wi-Fi® (i.e., the IEEE 802.11 standard), and/or other communication protocols or standards. Additionally, in some embodiments, the communication circuitry 130 may include devices and circuitry for enabling communications between the in-vehicle computing system 102 and the mobile computing devices 106 and/or the to-do-list server 110 over the network 108. The communication circuitry 130 may use any suitable communication protocol to communicate over the network 108 such as, for example, a wireless local area network communication protocol (e.g., Wi-Fi®), a cellular data server (e.g., Wideband Code Division Multiple Access (W-CDMA)), and/or a mobile satellite communication protocol.

The network 108 may be embodied as any number of various wired and/or wireless data and/or voice communication networks. For example, the network 108 may be embodied as, or otherwise includes, a local area network (LAN), a wide area network (WAN), or a publicly-accessible, global network such as the Internet. The in-vehicle computing system 102, the mobile computing devices 106, and/or the to-do-list server 110 may use any suitable communication protocol to communicate with each other over the network 108 depending on, for example, the particular type of network(s) 106. For example, in some embodiments, the network 108 may include one or more cellular networks to facilitate certain communications between the mobile computing devices 106 and/or between the mobile computing devices 106 and the in-vehicle computing system 102. In such embodiments, the cellular networks may use any suitable cellular communication technology to facilitate such communications such as, for example, Global System for Mobile Communications (GSM), General packet Radio Service (GPRS), Code Division Multiple Access (CDMA), and/or other cellular communication protocols, standards, or technologies.

The navigation circuitry 132 may be embodied as any type of circuitry and/or devices for facilitating navigation of the vehicle 104. For example, in one embodiment, the navigation circuitry 132 is embodied as, or otherwise includes, a global positioning system (GPS) engine for detecting or otherwise determining a current location of the vehicle 104. Additionally, the navigation circuitry 132 may maintain a roadmap database in, for example, the data storage 134. During use, the navigation circuitry 132 may retrieve relevant roadmaps from the roadmap database and present (e.g., display or verbally present) the roadmap, along with indicia of the location of the vehicle 104, to a driver of the vehicle 104. Of course, the navigation circuitry 132 may also perform additional navigation functions that are performed by typical navigation systems.

The data storage 134 may be embodied as any type of device or devices configured for the short-term or long-term storage of data such as, for example, memory devices and circuits, memory cards, hard disk drives, solid-state drives, or other data storage devices. As discussed above, the in-vehicle computing system 102 maintains and utilizes a "master" to-do-list 150, which may be stored in the data storage 134. Additionally, as discussed above, context data associated with each of the individual tasks comprising the master to-do-list 150 may be stored in a context database 152 of the data storage 134 in relation to the corresponding tasks. Further, the navigation circuitry 132 may maintain one or more roadmap databases in the data storage 134.

The peripheral devices 136 of the in-vehicle computing system 102 may include any number of additional input/output devices, interface devices, and/or other peripheral devices. For example, the peripheral devices 136 may include a display for displaying the to-do-lists and navigation data (e.g., roadmaps) and receiving input from the driver of the vehicle 104 (e.g., via a touch-screen display), an in-vehicle keyboard or other data input device, external speakers, and/or other peripheral devices. The peripheral devices 136 are communicatively coupled to the I/O subsystem 126 via a number of signal paths thereby allowing the I/O subsystem 126 and/or processor 120 to receive inputs from and send outputs to the peripheral devices 136.

In some embodiments, the in-vehicle computing system 102 may also include one or more sensors 138 configured to sense various environmental conditions. For example, in one embodiment, the sensors 138 include one or more seat sensors configured to sense when a passenger is sitting in a passenger seat. Additionally, the sensors 138 may include other sensors for detecting, for example, whether the vehicle is turned on, the speed of the vehicle, atmospheric conditions (e.g., is it raining or snowing), outside temperature (e.g., to determine whether returning home after a grocery trip is necessary), and/or other sensors for generating data useful to the in-vehicle computing system 102.

Figure 2:
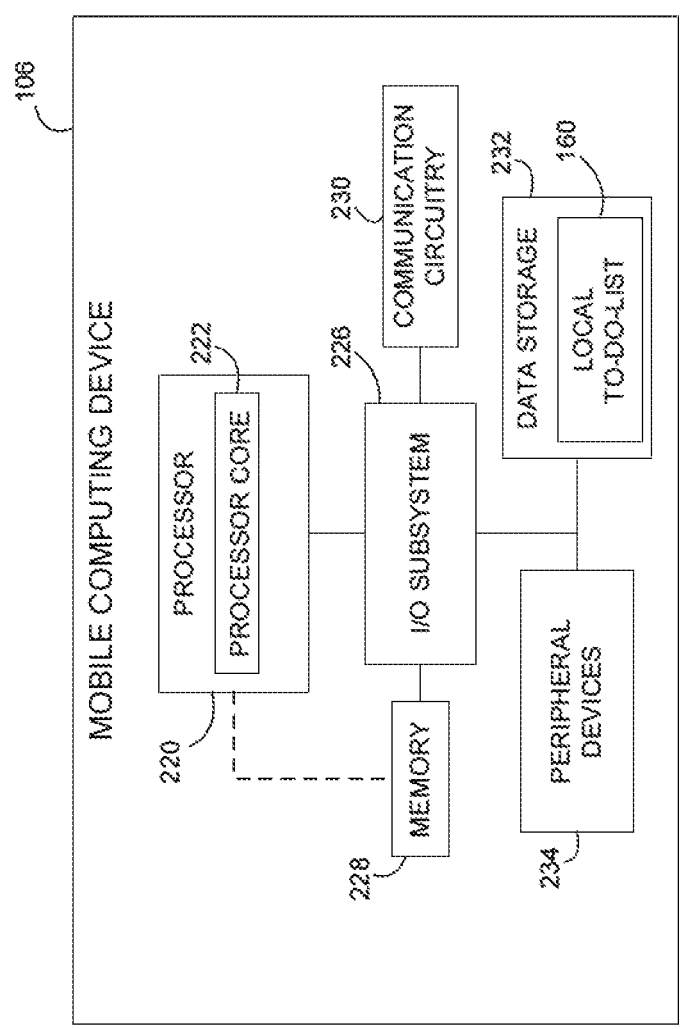
FIG. 2 is a simplified block diagram of at least one embodiment of a mobile computing device of the system of FIG. 1.

As discussed above, the system 100 may include one or more mobile computing devices 106, each of which stores a local to-do-list 160 as discussed in more detail below. Each mobile computing device 106 may be embodied as any type of mobile computing device such as a smart phone, a mobile internet device, a computing tablet, a laptop, a handheld computer, a personal digital assistant, a telephony device, or other mobile computing device. The mobile computing devices 106 may include devices, circuitry, and features commonly found in such devices. For example, as shown in FIG. 2, an illustrative mobile computing device 106 includes a processor 220, an I/O subsystem 226, a memory 228, a communication circuitry 230, a data storage device 232, and one or more peripheral devices 234. Of course, the mobile computing devices 106 may include additional circuits, devices, modules, and structures typically found in mobile computing devices, which are not illustrated in FIG. 2 for clarity of the description.

The processor 220 of the mobile computing device 106 may be embodied as any type of processor capable of executing software/firmware, such as a microprocessor, digital signal processor, microcontroller, or the like. The processor 220 is illustratively embodied as a single core processor having a processor core 222. However, in other embodiments, the processor 220 may be embodied as a multi-core processor having multiple processor cores 222. Additionally, the mobile computing device 106 may include additional processors 220 having one or more processor cores 222.

The I/O subsystem 226 of the mobile computing device 106 may be embodied as circuitry and/or components to facilitate input/output operations with the processor 220 and/or other components of the mobile computing device 106. In some embodiments, the I/O subsystem 166 may be embodied as a memory controller hub (MCH or "northbridge"), an input/output controller hub (ICH or "southbridge"), and a firmware device. However, in other embodiments, I/O subsystems having other configurations may be used. For example, in some embodiments, the I/O subsystem 226 may form a portion of a system-on-a-chip (SoC) and be incorporated, along with the processor 220 and other components of the mobile computing device 106, on a single integrated circuit chip.

The processor 220 is communicatively coupled to the I/O subsystem 226 via a number of signal paths, which may be embodied as any type of signal paths capable of facilitating communication between the components of the mobile computing device 106. For example, the signal paths may be embodied as any number of wires, cables, light guides, printed circuit board traces, via, bus, intervening devices, point-to-point interconnects, and/or the like.

The memory 228 of the mobile computing device 106 may be embodied as, or otherwise include, one or more memory devices or data storage locations including, for example, dynamic random access memory devices (DRAM), synchronous dynamic random access memory devices (SDRAM), double-data rate synchronous dynamic random access memory device (DDR SDRAM), mask readonly memory (ROM) devices, erasable programmable ROM (EPROM), electrically erasable programmable ROM (EEPROM) devices, flash memory devices, and/or other volatile and/or non-volatile memory devices. The memory 228 is communicatively coupled to the I/O subsystem 226 via a number of signal paths. Various data and software may be stored in the memory 228. For example, one or more operating systems, mobile applications, programs, libraries, and drivers may reside in memory 228 during execution.

The communication circuitry 230 of the mobile computing device 106 may be embodied as any number of devices and circuitry for enabling communications between the mobile computing device 106 and other mobile computing devices 106, the in-vehicle computing system 102, and/or the to-do-list server 110. As such, the communication circuitry 230 may include cellular communication circuitry for voice and data communications (e.g., for communicating with other mobile computing devices 106 via a cellular network), wired communication circuitry for communicating data over the network 108, and/or wireless communication circuitry for local data communications (e.g., for communicating with the in-vehicle computing system 102). As discussed above, the mobile computing device 106 may use any suitable communication protocol to communicate with the in-vehicle computing system 102 such as, for example, Bluetooth®, Wi-Fi®(i.e., the IEEE 802.11 standard), and/or other communication protocols or standards.

The data storage device(s) 232 may be embodied as any type of device or devices configured for the short-term or long-term storage of data such as, for example, memory devices and circuits, memory cards, hard disk drives, solid-state drives, or other data storage devices. As discussed above, the mobile computing device 106 stores a local to-do-list 160 in the data storage 232, which includes to-do tasks that are periodically or responsively synchronized with the master to-do-list 150 maintained by the in-vehicle computing system 102. For example, as discussed in more detail below, when the mobile computing device 106 is within proximity to the in-vehicle computing system 102, the mobile computing device 106 may communicate with the in-vehicle computing system 102 to update or otherwise synchronize the local to-do-list 160 to the master to-do-list 150. The tasks stored in the local to-do-list 160 may be entered via the mobile computing device 106, retrieved from the master to-do-list 150, and/or retrieved from a master to-do-list 180 stored on a to-do-list server 110 as discussed in more detail below.

The peripheral devices 234 of the mobile computing device 106 may include any number of peripheral or interface devices. For example, the peripheral devices 234 may include a display, a keyboard, a mouse, external speakers, and/or other peripheral devices depending on the type of mobile computing device (e.g., smart phone, computer tablet, laptop computer, etc.). The peripheral devices 234 are communicatively coupled to the I/O subsystem 226 via a number of signal paths thereby allowing the I/O subsystem 226 and/or processor 220 to receive inputs from and send outputs to the peripheral devices 234.

Referring back to FIG. 1, the to-do-list server 110 may be embodied as any type of data server capable of performing the functions described herein. As such, the to-do-list server may include various hardware and software components typically found in a server for communicating, storing, maintaining, and transferring data over a network. The illustrative to-do-list server 110 includes a web service engine 170 to provide a web portal to the in-vehicle computing system 102 and/or the mobile computing devices 106 for various web services such backing up, retrieving, and updating the to-do-list data stored on each device. As such, the to-do-list server 110 also includes a data storage 172, which may be embodied as any type of long-term storage device such as one or more hard disk drives, sold-state devices, non-volatile memory, and/or other data storage devices typically found in network-based data servers. In some embodiments, the data storage 172 stores a local master to-do-list 180. The master to-do-list 180 may be a substantial copy of the master to-do-list 150 stored on the data storage 134 of the in-vehicle computing system. In such embodiments, the master to-do-list 180 is periodically or responsively synchronized with the master to-do-list 150 and/or the local to-do-lists 160 stored on the mobile computing devices 106. It should be appreciated that although the master to-do-list 150 maintained by the in-vehicle computing system 102 is typically the most current master list, the master to-do-list 180 provides a back-up master list for the in-vehicle computing system 102, which is also available to the mobile computing devices 106 at times when the communication with the in-vehicle computing system 102 is not available (e.g., the mobile computing device 106 is not near the vehicle 104, the vehicle 104 is turned off, etc.).

Figure 3:
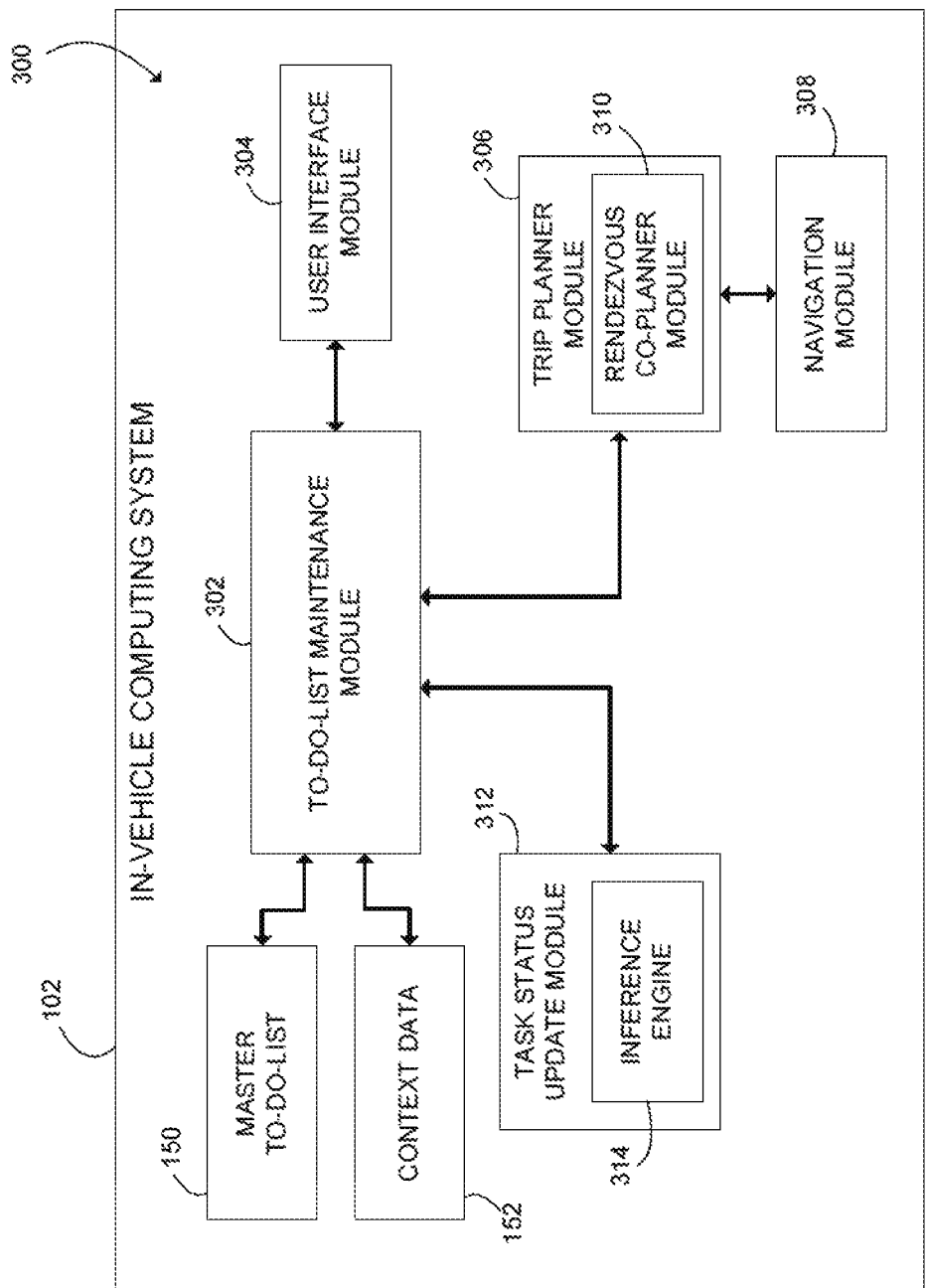
FIG. 3 is a simplified block diagram of at least one embodiment of a software environment of an in-vehicle computing system of the system of FIG. 1.

Referring now to FIG. 3, during operation, the in-vehicle computing system 102 establishes a software environment 300 for maintaining the master to-do-list 150 and providing to-do-list-based navigation. The illustrative software environment 300 includes a to-do-list maintenance module 302, a user interface module 304, a trip planner module 306, a navigation module 308, a task status update module 312, and the master to-do-list 150 and associated context data 152. Each of the modules 302, 304, 306, 308, 312 may be embodied as or otherwise include stand-alone software applications, software/firmware modules, and/or hardware.

The to-do-list maintenance module 302 manages, maintains, and synchronizes the master to-do-list 150 and associated context data 152. Additionally, in some embodiments, the to-do-list maintenance module 302 may be configured to prioritize the tasks (e.g., order the tasks) included in the master to-do-list 150 based on the associated context data 152 (e.g., required dates of completion) and/or other criteria. Of course, as discussed in more detail below, the user of the in-vehicle computing system 102 may select any tasks from the master to-do-list 150 for completion at any particular time, including selecting tasks out of the prioritized order (e.g., the user may desire to complete a task early).

The to-do-list maintenance module 302 interfaces with the user interface module 304 to provide a user interface of the master to-do-list 150 to a user (e.g., a driver or passenger of the vehicle 104) of the in-vehicle computing system 102. The user interface may be embodied as a graphical user interface, an audio user interface, or any other type of user interface. The user may interact with the user interface to update tasks of the master to-do-list 150, add new tasks to the master to-do-list 150, and/or select tasks for completion as discussed in more detail below.

The to-do-list maintenance module 302 also interfaces with the trip planner module 306 to generate a trip plan for a selected number of tasks of the master to-do-list 150. That is, as discussed in more detail below, the trip planner module 306 is configured to determine an order of priority for completion of a group of user-selected tasks based on the context data 152 associated with each task and navigation data related to each task, which is retrieved or provided from the navigation module 308. As discussed above, each task typically includes a specific or general destination location, which may be used by the trip planner module 306 to prioritize the tasks and by the navigation module 308 to generate the proposed directions, trip times, etc. In those cases wherein a task is associated with only a general destination location (e.g. "pick up milk from the store"), the trip planner module 306 may be configured to infer or otherwise assign a specific destination based one or more criteria such as frequency of visits to the destination location (i.e., does the user like that particular store or location), the location of the destination relative to the current location of the vehicle 104, the user's home, location of the destinations of other selected tasks, offers made by merchants (e.g., coupons), and so forth.

As discussed above, the context data associated with a particular task may define one or more attributes of the task itself or the destination associated with the task. For example, the context data may include constraint data that identifies a due date by which an associated task must be completed, a time window in which the associated task must be completed, or other constraints or requirements associated with the task. Additionally or alternatively, the context data may define constraint data associated with the designation location associated with each task. The trip planner module 306 is configured to prioritize or order the selected tasks so as to satisfy the context data or otherwise ensure the task priority is consistent with such context data. Additionally, in some embodiments, the trip planner module 306 may further attempt to achieve defined goals in prioritizing the selected tasks. For example, the trip planner module 306 may be configured to order the tasks so as to reduce the overall drive time required to complete the selected tasks, reduce the overall drive distance required to complete the selected tasks, and/or achieve similar or other goals. To do so, the trip planner module 306 may interface with the navigation module 308 to retrieve map and/or trip data from the navigation module 308.

In some embodiments, the trip planner module 306 may also include a rendezvous co-planner module 310. In such embodiments, the rendezvous co-planner module 310 is configured to communicate with a corresponding rendezvous co-planner module of a mobile computing device 106 to determine a destination location at which the user of the in-vehicle computing system 102 (i.e., the driver of the vehicle 104) and the user of the mobile computing device 106 may meet. To do so, as discussed in more detail below, the rendezvous co-planner module 310 may communicate with the corresponding rendezvous co-planner module of the mobile computing device 106 to determine a current location of the user of the mobile computing device and subsequently determine a suitable rendezvous location based on the current location of the user of the mobile computing device, the current location of the vehicle 104, and/or the context data 152. For example, the context data 152 may define constraint data associated with the current location of the user of the mobile computing device 106 that may be accounted for in determining the rendezvous location (e.g., a one-way street or entrance). After the rendezvous co-planner module 310 determines the rendezvous location, the module 310 may communicate the rendezvous location to the trip planner 306 for prioritization with any remaining tasks.

The navigation module 308 stores navigation data such as roadmaps and generates proposed directions or paths from an origination location to a destination location. As discussed above, each task typically includes a destination location (either specific or general). The navigation module 308 is configured to generate directions from an origination location, which may be a destination location of the last completed task or a current location of the vehicle 104, to the destination location associated with each task. Such directions are used by the trip planner module 306 to prioritize the tasks as discussed above.

The task status update module 312 is configured to provide updates as to the completion of a current task or set of tasks to the one or more users of the mobile computing devices 106. The task updates may include any type of data useful to a user of the mobile computing device 106 to determine or otherwise infer completion of one or more tasks. For example, such updates may include communicating the current location of the vehicle 104, whether the task has been completed, estimated time of arrival to a destination location based on navigation data from the navigation module 308, and so forth. In some embodiments, the task status update module 312 may include an inference engine 314 configured to infer whether a task has been completed. To do so, the inference engine 314 may use any suitable data to determine the completion of a task. For example, in some embodiments, the inference engine 314 may determine that a task has been completed by determining whether a particular mobile computing device 106 (e.g., a phone of a child) is within a reference proximity to the in-vehicle computing system 102, whether a passenger seat is occupied by a passenger via the sensor 138, whether a purchase has been made (e.g., based on a digital receipt), and/or any other data useful in making such determinations.

Figure 4:
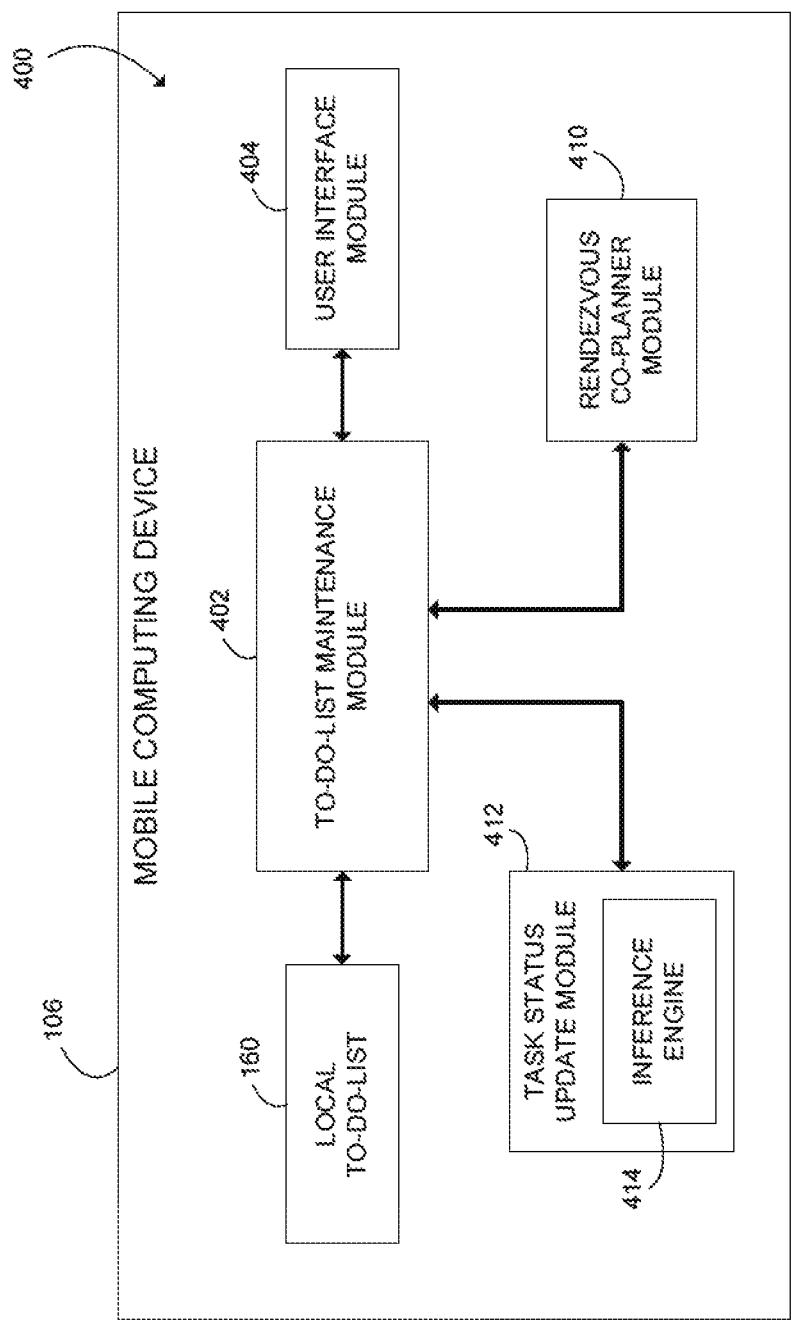
FIG. 4 is a simplified block diagram of at least one embodiment of a software environment of the mobile computing device of FIG. 2.

Referring now to FIG. 4, similar to the in-vehicle computing system 102, each mobile computing device 106 may establish a software environment 400 for maintaining the local to-do-list 160. The illustrative software environment 400 includes a to-do-list maintenance module 402, a user interface module 404, a rendezvous co-planner module 410, a status update module 412, and the local to-do-list 160. Each of the modules 402, 404, 410, and 412 may be embodied as, or otherwise include, stand-alone software applications, software/firmware modules, and/or hardware.

Similar to the to-do-list maintenance module 302 of the in-vehicle computing system 102, the to-do-list maintenance module 402 manages, updates, and synchronizes the local to-do-list 160 with the master to-do-list 150 maintained by the in-vehicle computing system. The to-do-list maintenance module 402 interfaces with the user interface module 404 to allow a user of the mobile computing device 106 to add or update a new task on the mobile computing device 106. As such, when the mobile computing device 106 is in proximity to the in-vehicle computing system, the to-do-list maintenance module 402 may communicate with the to-do-list maintenance module 302 to synchronize or otherwise update the master to-do-list 150 with the local to-do-list 160. Alternatively, the mobile computing device 106 may communicate with the to-do-list server 110 to synchronize the master to-do-list 180 with the local to-do-list 160, which may subsequently be used to synchronize or otherwise update the master to-do-list 150 managed by the in-vehicle computing system via the network 108.

The rendezvous co-planner module 410 is substantially similar to the rendezvous co-planner module 310 of the in-vehicle computing system 102. The rendezvous co-planner module 410 is configured to communicate with the rendezvous co-planner module 310 of the in-vehicle computing system 102 to determine a destination location at which the user of the mobile computing device 106 and the driver of the vehicle 104 may meet. To do so, the rendezvous co-planner module 410 may communicate various data to the in-vehicle computing system 102, such as the current location of the user of the mobile computing device 106, usable by the rendezvous co-planner module 310 to determine a suitable rendezvous location.

The task status update module 412 of the mobile computing device 106 is configured to update the status of tasks contained in the local to-do-list 160 based on data received from the in-vehicle computing system 102 and/or determine a status of completion of a task of the local to-do-list 160. As discussed above, the in-vehicle computing system 102 may communicate updates to the mobile computing device 106 regarding the completion of a particular task. In response, the status update module 412 is configured to update the corresponding task on the mobile computing device 106. Such updates may include completion of the task, acceptance of the task by another user, or an update of the progress of completion of the task.

In some embodiments, the status update module 412 may include a local inference engine 414. Similar to the inference engine 314 of the in-vehicle computing system 102, the inference engine 414 may be configured to infer whether a task has been completed. To do so, the inference engine 414 may use any suitable data to determine the completion of the task including, for example, the location of the mobile computing device 106, whether a purchase has been made, and so forth. Any inference of task completion may be communicated to the in-vehicle computing system 102 and/or the to-do-list server 110 as a task status update as discussed above.

Figure 5:
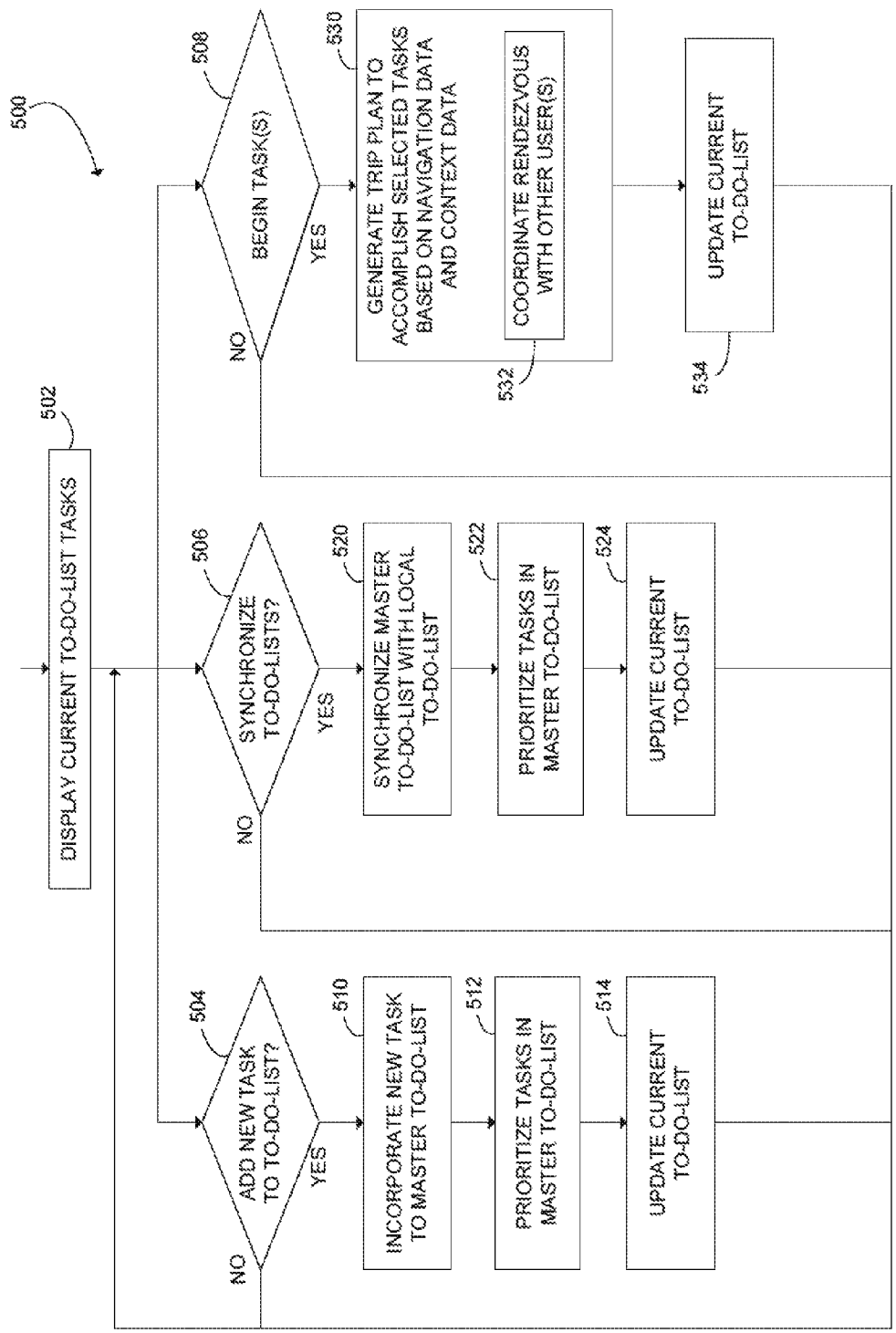
FIG. 5 is a simplified flow diagram of at least one embodiment of a method for providing to-do-list based navigation.

Referring now to FIG. 5, one illustrative embodiment of a method 500 for to-do-list based navigation that may be executed by the in-vehicle computing system 102 is shown. The method 500 begins with block 502 in which the in-vehicle computing system 102 presents the current tasks contained in the master to-do-list 150. The tasks may be presented to the user of the in-vehicle computing system 102 (e.g., the driver or passenger of the vehicle 104) by displaying the tasks on an in-vehicle display, such as the navigation display, by audibly "speaking" the tasks through an audio interface of the in-vehicle computing system 102, or the like. The in-vehicle computing system 102 may be configured to present automatically the current tasks upon vehicle startup or in response to selection of a button, icon, or similar input device.

In blocks 504, 506, and 508, the in-vehicle computing system 102 monitors for selection of one of a number of different actions by a user of the system 102. For example, in block 504, the in-vehicle computing system 102 determines whether a user has requested to enter a new task. The user may enter, for example, a new task by selecting a corresponding button or icon on a graphical user interface displayed to the user or by verbally speaking the new task into an audible user interface. The user may enter the new task to be completed along with any corresponding data, such as a destination location, and context data, which may define one or more attributes of the task or destination location. After the user has entered the new task into the in-vehicle computing system 102, the new task is incorporated into the master to-do-list 150 and stored in the data storage 134 in block 510. Additionally, any context data entered by the user, or determined by the in-vehicle computing system, is stored in the context database 152 in association with the newly entered task.

In some embodiments, the in-vehicle computing system 102 may prioritize the tasks contained in the master to-do-list 150 in block 512 after the addition of any new task. As discussed above, the in-vehicle computing system 102 may utilize the context data or other criteria to prioritize the tasks. For example, the tasks may be prioritized based on a required date of completion, an "urgent" signifier attached to the task, or other criteria. After the in-vehicle computing system 102 has prioritized the tasks, the tasks of the updated master to-do-list 150 are presented to the user in block 514. In this way, the user of the in-vehicle computing system 102 may directly add additional tasks to the master to-do-list 150, update tasks of the master to-do-list 150, and/or otherwise manage (e.g., delete or remove) tasks of the master to-do-list 150.

Figure 6:
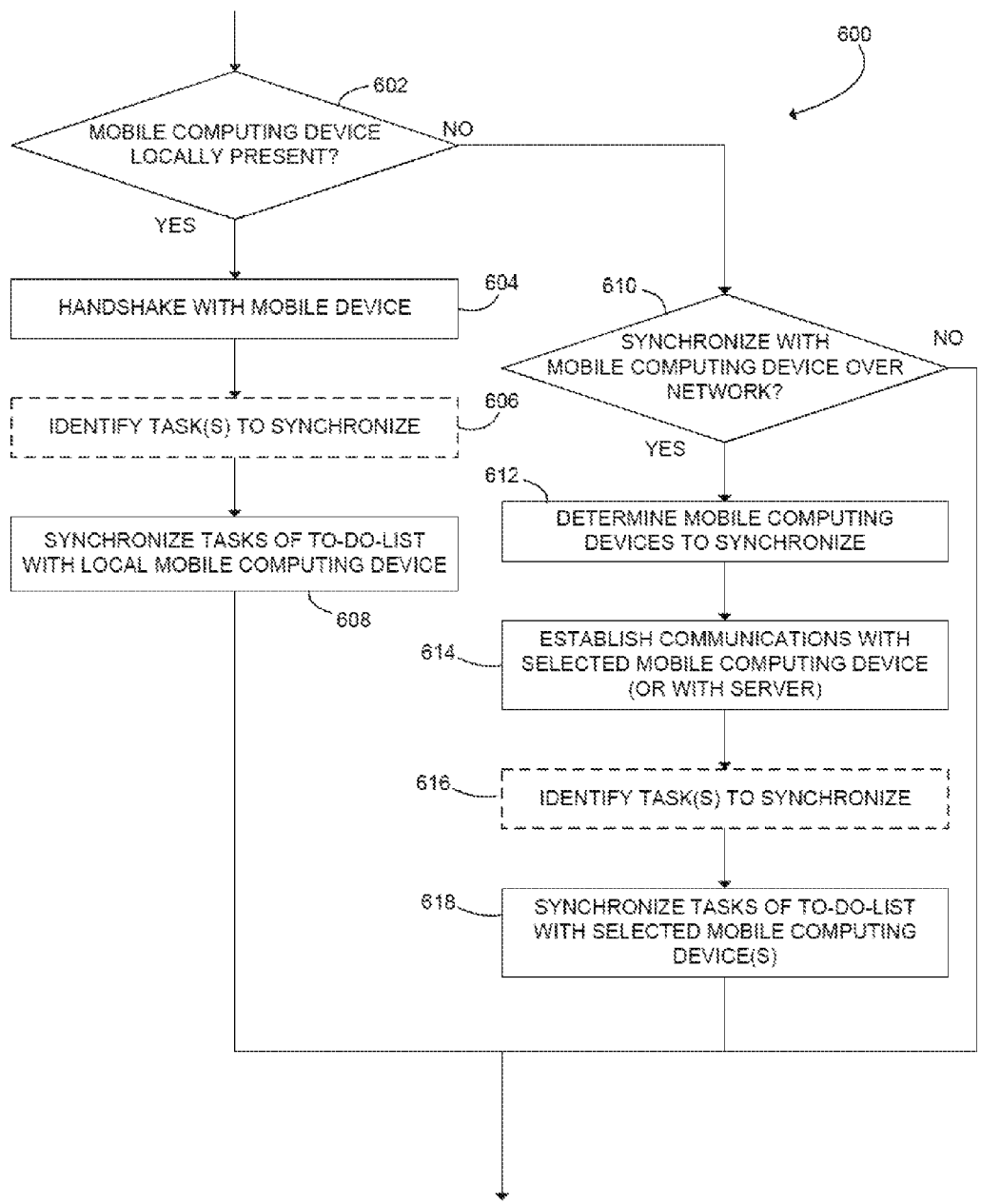
FIG. 6 is a simplified flow diagram of at least one embodiment of a method for synchronizing to-do-lists across devices of the system of FIG. 1.

Referring back to block 506, the in-vehicle computing system 102 may also determine whether the master to-do-list 150 should be synchronized with a local to-do-list 160 of a mobile computing device 106 in block 506. If so, the master to-do-list 150 and the local to-do-list 160 are synchronized in block 520. To do so, the in-vehicle computing system 102 may execute a method 600 for synchronizing the master to-do-list 150 and the local to-do-list 160 as shown in FIG. 6. The method 600 begins with block 602 in which the in-vehicle computing system 102 determines whether the mobile computing device is locally present (e.g., in or near the vehicle 104). The in-vehicle computing system 102 may determine the mobile computing device 106 is locally present based on short-range communications (e.g., Bluetooth®) from the mobile computing device 106. That is, the mobile computing device 106 may be configured to attempt communications with the in-vehicle computing system 102 when the mobile computing device 106 is near. If so, communication between the in-vehicle computing system 102 and the mobile computing device 106 is established in block 604 via "handshaking" or other communication set-up procedure.

The tasks of the local to-do-list 160 may be synchronized or otherwise updated to the master to-do-list 150 automatically or selectively. For example, in some embodiments, the user of the mobile computing device 106 may select those tasks of the local to-do-list 160 to synchronize with the master to-do-list 150. Alternatively, the tasks to be synchronized may be selected from a user interface of the in-vehicle computing system 102. Regardless, in block 608, the selected tasks are synchronized between the local to-do-list 160 and the master to-do-list 150. Typically, such synchronization may include updating the master to-do-list with new tasks of the local to-do-list 160, which were entered on the mobile computing device 106. However, tasks located in the local to-do-list 160 may also be updated based on the status of tasks of the master to-do-list 150 (e.g., if the task shows completed in the master to-do-list 150).

Referring back to block 602, if the mobile computing device is not locally present, the in-vehicle computing system 102 determines whether to remotely synchronize with the mobile computing device 106 (or the to-do-list server 110) over the network 108. To do so, a user of the in-vehicle computing system 102 may select an option to synchronize remotely the master to-do-list 150 and the local to-do-list 160. If so, the mobile computing device(s) 106 to be synchronized is determined in block 612. For example, the user of the in-vehicle computing system 102 may select one or more mobile computing devices 106 or the to-do-list server 110 from a list displayed on a graphical user interface of the in-vehicle computing system 102 or by speaking a keyword associated with the devices 106 or server 110 into an audible user interface of the in-vehicle computing system 102.

In block 614, the in-vehicle computing system 102 establishes communications with the mobile computing device 106 or the to-do-list server 110 over the network 108. In block 616, the tasks of the local to-do-list 160 or the master to-do-list 180 may be selected as discussed above with regard to block 606. Subsequently, in block 618, the selected tasks are synchronized between the local to-do-list 160 or master to-do-list 180 and the master to-do-list 150.

Referring back to FIG. 5, after the master to-do-list 150 is synchronized in block 520, the in-vehicle computing system 102 may prioritize the tasks contained in the master to-do-list 150 in block 522. As discussed above, the in-vehicle computing system 102 may utilize the context data or other criteria to prioritize the tasks. Subsequently, in block 524, the tasks of the updated master to-do-list 150 are presented to the user as discussed above with regard to block 514.

Figure 7:
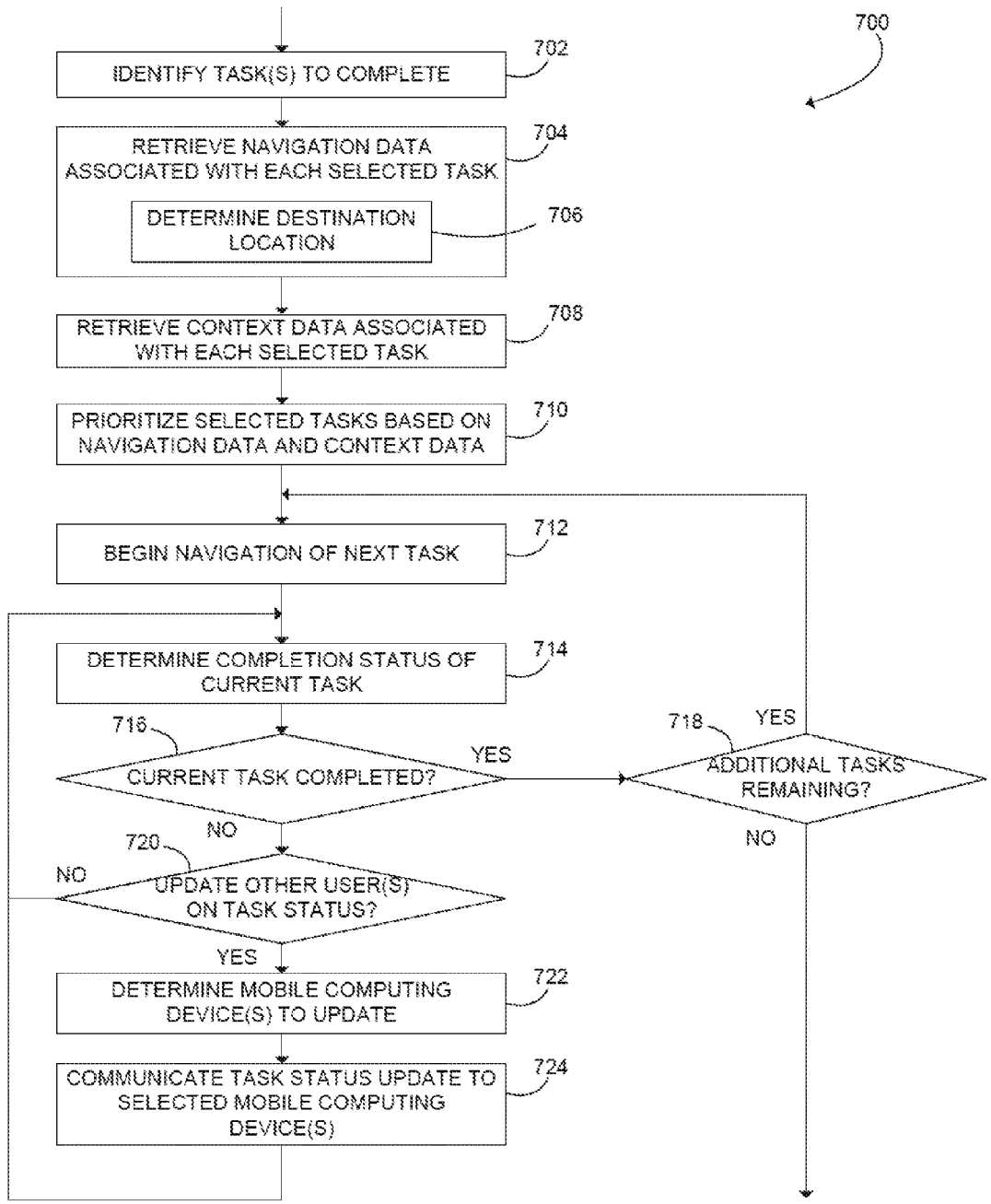
FIG. 7 is a simplified flow diagram of at least one embodiment of a method for generating a trip plan for completing a selection of tasks of a to-do-list.

Referring back to block 508, the in-vehicle computing system 102 may also determine whether the user of the in-vehicle computing system 102 desires to begin one or more tasks of the master to-do-list 150. If so, in block 530, the in-vehicle computing system 102 generates a trip plan to accomplish the selected tasks of the master to-do-list 150 based on navigation data and the context data 152 associated with each task. To do so, the in-vehicle computing system 102 may execute a method 700 for generating a trip plan for completing the selected tasks. As shown in FIG. 7, the method 700 begins with block 702 in which the tasks to be completed are identified. For example, the user of the in-vehicle computing system 102 may select a subset of tasks from the master to-do-list 150 to complete in a given driving session. As discussed above, the tasks of the master to-do-list 150 may be presented to the user in a prioritized order.

In block 704, the in-vehicle computing system 102 retrieves navigation data associated with each of the selected tasks in block 704. The in-vehicle computing system 102 may retrieve such navigation data from the navigation module 308 as discussed above. The in-vehicle computing system 102 may also determine a destination location for any task that does not include a specific destination. For example, a task may simply read as "pick child up from school" or "pick up milk from grocery store." If so, the in-vehicle computing system 102 determines the specific destination for such tasks in block 706. To do so, the in-vehicle computing system 102 may be configured to learn the appropriate destination over time or infer the destination based on the context data or other data. Alternatively, the user of the in-vehicle computing system may simply enter the specific destination or otherwise correct the destination determined by the in-vehicle computing system 102.

In block 708, the in-vehicle computing system 102 retrieves the context data associated with each task and prioritizes the selected tasks based on the navigation and the retrieved context data in block 710. As discussed above, the context data may define one or more attributes associated with the task itself or the destination location, which may be used by the in-vehicle computing system 102 to determine an order of the tasks. Such prioritizing or ordering of tasks may be done so as to achieve some defined goal such as reducing the overall drive time, drive distance, or the like. Of course, in some embodiments, the user may reorder the tasks as desired.

In block 712, the in-vehicle computing system 102 begins navigation of the next task. To do so, in some embodiments, the in-vehicle computing system 102 may present a road map to the user with indicia of the vehicle's current local and destination associated with the first task. Such road map data may be retrieved or otherwise provided by the navigation module 308. Additionally or alternatively, the in-vehicle computing system 102 may provide audible navigation to the user to guide the user to the destination location. As the current task is being completed, the in-vehicle computing system 102 determines the status of the current task in block 714. As discussed above, the in-vehicle computing system 102 may determine the completion status of the task based on any one or more criteria such as the location of the vehicle 104 relative to the destination location, estimated arrival time to the destination location, the proximity to a particular mobile computing device 106 (e.g., a child's phone), the presence of a passenger in the vehicle based on sensor data from the sensor 138, the generation of a digital receipt, and/or other data.

The in-vehicle computing system 102 determines whether the current task has been completed in block 716 based on the completion or update status of the current task determined in block 714. If so, the in-vehicle computing system 102 determines whether any additional tasks remain in the selected subset of tasks to be completed during the current driving session. If additional tasks remain, the method 700 loops back to block 712 wherein the next task is initiated. If not, the method 700 exits.

Referring back to block 716, if the current task is not completed, the method 700 advances to block 720 in which the in-vehicle computing system 102 determines whether to update one or more users of the mobile computing devices 106 of the status of the current task. The in-vehicle computing system 102 may determine whether to update the mobile computing devices 106 based on the context data associated with the current task (e.g., the task may be identified as a task whose status should be communicated) or via selection by the user of the in-vehicle computing device. If not, the method 700 loops back to block 714 in which the in-vehicle computing system 102 resumes monitoring the status of the current task as discussed above.

However, if the in-vehicle computing system 102 determines that one or more mobile computing devices 106 should be updated with the status of the current task, the method 700 advances to block 722 in which the mobile computing devices 106 to be updated is determined. As discussed above, the particular mobile computing devices 106 to be updated may be included in the context data of the current task or simply entered by the user of the in-vehicle computing system 102.

In block 724, the in-vehicle computing system 102 establishes communications with the mobile computing device(s) 106 and communicates the status of the current task to the mobile computing device 106. The method 700 subsequently loops back to block 714 in which the in-vehicle computing system 102 resumes monitoring the status of the current task as discussed above. In this way, each of the selected tasks may be completed based on the navigation data and the context data associated with each task.

Figure 8:
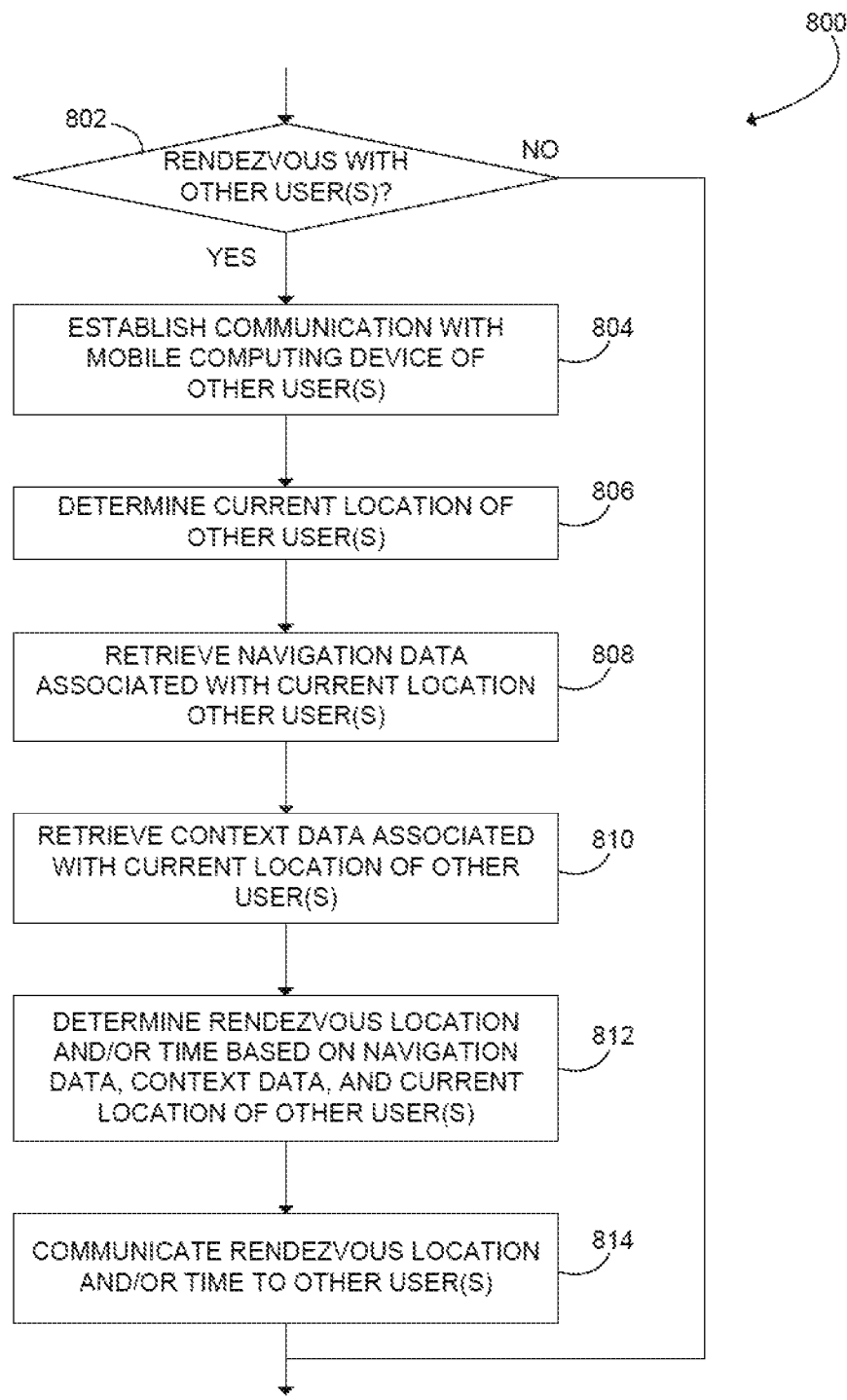
FIG. 8 is a simplified flow diagram of at least one embodiment of a method for coordinating a rendezvous with a user of a mobile computing device.

Referring back to block 530 of FIG. 5, in some embodiments, one of the selected tasks may require rendezvousing with a user of a mobile computing device 106 (e.g., to pickup the user). If so, the in-vehicle computing system 102 may execute a method 800 for coordinating a rendezvous with the user of a mobile computing device 106 as illustrated in FIG. 8. The method 800 begins with block 802 in which the in-vehicle computing system 102 determines whether to rendezvous with the user of the mobile computing device 106. If so, the method 800 advances to block 804 in which the in-vehicle computing system 102 establishes communication with the mobile computing device 106 (e.g., over the network 108). In block 806, the in-vehicle computing system 102 determines the current location of the user of the mobile computing device 106. For example, the mobile computing device 106 may determine its current location and communicate such location to the in-vehicle computing system 102.

In block 808, the in-vehicle computing system 102 retrieves navigation data associated with the current location of the user of the mobile computing device 106 from the navigation module 308. For example, the in-vehicle computing system 102 may access a roadmap of the area of the current location of the mobile computing device 106. Additionally, in block 810, the in-vehicle computing system 102 retrieves context data associated with the current location of the user of the mobile computing device 106. Such context data may define attributes about the current location of the mobile computing device 106, which may be used to determine the rendezvous location. For example, the context data may provide constraint data informing that a particular parking lot entrance is one-way or that a particular street is one-way during a particular time of day.

In block 812, the in-vehicle computing system 102 determines a rendezvous location and time at which to meet the user of the mobile computing device 106 based on the navigation data, the retrieved context data, and the current location of the mobile computing device 106. In some embodiments, the in-vehicle computing system 102 may attempt to achieve one or more goals in determining the rendezvous location such as, for example, reducing the traveling distance from the user of the mobile computing device 106, reducing the time until rendezvous, reducing driving time or distance, and/or the like. Subsequently, in block 814, the in-vehicle computing system 102 communicates the determined rendezvous location and/or meeting/pickup time to the mobile computing device 106 via the network 108. In some embodiments, the user of the mobile computing device 106 may accept, deny, or modify the determined rendezvous location and/or time.

Referring back to FIG. 5, after the selected tasks have been completed, the in-vehicle computing system 102 updates the tasks of the master to-do-list 150 and presents the updated list of tasks to the user of the vehicle 104 in block 534. In this way, the user may select tasks from the master to-do-list 150 to be completed for a given driving session and receive to-do-list based navigation to complete the selected tasks, which are updated during and after each driving session.

It should be appreciated that although the in-vehicle computing system 102 has been described above in regard as being a component of, attached to, or otherwise incorporated in the vehicle 104, the in-vehicle computing system 102 may be embodied as a mobile computing system carried by a driver or passenger of the vehicle 104 in other embodiments. For example, the in-vehicle computing system 102 may be embodied as a smart phone, computing tablet, notebook computer, mobile internet device, laptop computer, or other mobile computing device. Similarly, the navigation circuitry 132 and navigation module 308 may be embodied as a stand-alone device (e.g., a mobile navigation device) to which the in-vehicle computing system 102 may communicate to retrieve navigation data as discussed above.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
receiving a selection of tasks from a to-do-list maintained by an in-vehicle computing system, the to-do-list comprising a plurality of tasks that may be performed in one of a plurality of different sequential orders;
determining, with the in-vehicle computing system, navigation data for a location associated with each of the selected tasks;
retrieving context data associated with each of the selected tasks from a data storage of the in-vehicle computing system, the context data defining a temporal constraint of each corresponding selected task, wherein at least one of the temporal constraints is a due date for completing a corresponding selected task, wherein the due date indicates that the corresponding selected task may be completed at any time before the due date;
determining, with the in-vehicle computing system, an order of priority of the selected tasks based on both of (i) the navigation data and (ii) the temporal constraint of the context data associated with each of the selected tasks;
providing navigation information on the in-vehicle computing system for the selected tasks based on the determined order of priority; and
communicating, to a mobile computing device, a plurality of status updates regarding a progress of completion of the selected tasks.

2. The method of claim 1, wherein retrieving context data comprises retrieving context data that identifies:
a window of time during which a task of the selected tasks can be completed, wherein the window of time comprises a beginning time and an end time, and wherein the window of time indicates that the task of the selected task may be completed at any time before the end time and after the beginning time.

3. The method of claim 1, wherein determining the order of priority of the selected tasks comprises determining an order of priority of the selected tasks to minimize at least one of a total travel time required to complete the selected tasks or a total distance traveled to complete the selected tasks.

4. The method of claim 1, wherein communicating the plurality of status updates comprises:
determining, with the in-vehicle computing system, an estimated time of arrival to a destination location; and
communicating the estimated time of arrival to the mobile computing device.

5. The method of claim 1, wherein communicating the plurality of status updates comprises:
determining, with the in-vehicle computing system, that a current task is completed; and
communicating that the current task is completed to the mobile computing device.

6. The method of claim 5, wherein the current task comprises a rendezvous with a user of a second mobile computing device, and wherein determining that the current task is completed comprises:
communicating with the second mobile computing device to determine a location of the second mobile computing device; and
verifying that the location of the second mobile computing device is within a reference proximity to the in-vehicle computing system.

7. The method of claim 5, wherein determining that the current task is completed comprises:
determining, with the in-vehicle computing system, a current location of a vehicle in which the in-vehicle computing system is included; and
verifying that the current location of the vehicle is equal to a destination location associated with the current task.

8. An in-vehicle computing device comprising:
a processor; and
a memory having stored therein a plurality of instructions that, in response to being executed by the processor, results in the in-vehicle computing system:
displaying a to-do-list on a display, the to-do-list comprising a plurality of tasks that may be performed in one of a plurality of different sequential orders;
receiving a user's selection of the tasks to be completed;
determining navigation data for a destination location associated with each of the selected tasks;
retrieving constraint data associated with each of the selected tasks, the constraint data defining a temporal constraint of each corresponding selected task, wherein at least one of the temporal constraints is a due date for completing a corresponding selected task, wherein the due data indicates that the corresponding selected task may be completed at any time before the due date;
determining an order of completion for the selected tasks based on both of (i) the navigation data and (ii) the temporal constraint data; and
providing navigation information on the display for a first task of the selected tasks based on the determined order of completion; and
communicating, to a mobile computing device, a plurality of status updates regarding a progress of completion of the first task.

9. The in-vehicle computing device of claim 8, wherein the constraint data identifies a requirement to return to the home of a user of the in-vehicle computing system prior to beginning subsequent tasks.

10. The in-vehicle computing device of claim 8, wherein the constraint data identifies a window of time during which a task of the selected tasks can be completed, wherein the window of time comprises a beginning time and an end time, and wherein the window of time indicates that the task of the selected task may be completed at any time before the end time and after the beginning time.

11. The in-vehicle computing device of claim 8, wherein communicating the plurality of status updates comprises:
determining, for each status update, an estimated time of arrival to a destination location; and
communicating the estimated time of arrival to the mobile computing device.

12. The in-vehicle computing device of claim 8, wherein communicating the plurality of status updates comprises:
determining that the first task is completed; and
communicating that the first task is completed to the mobile computing device.

13. The in-vehicle computing device of claim 12, wherein the first task comprises a rendezvous with a user of a second mobile computing device, and wherein determining that the first task is completed comprises:

communicating with the second mobile computing device to determine a location of the second mobile computing device; and verifying that the location of the second mobile computing device is within a reference proximity to the in-vehicle computing system.

14. The in-vehicle computing device of claim 12, wherein determining that the first task is completed comprises:

determining a current location of a vehicle in which the in-vehicle computing system is included; and verifying that the current location of the vehicle is equal to a destination location associated with the first task.

15. The in-vehicle computing device of claim 12, further comprising:

receiving a confirmation of a credit card purchase; and receiving sensor data from a sensor of the vehicle that a passenger seat is occupied, wherein determining that the first task is completed comprises determining that the first task is completed based on the confirmation and the sensor data.

16. One or more non-transitory, machine readable media comprising a plurality of instructions that in response to being executed result in an in-vehicle computing system:

determining a selection of tasks from a to-do-list maintained by the in-vehicle computing system, the to-do-list comprising a plurality of tasks that may be performed in one of a plurality of different sequential orders;

determining navigation data for a destination location associated with each of the selected tasks;

retrieving context data associated with each of the selected tasks from a data storage of the in-vehicle computing system, the context data defining an attribute of the a temporal constraint of each corresponding selected task, wherein at least one of the temporal constraints is a due date for completing a corresponding selected task, wherein the due date indicates that the corresponding selected task may be completed at any time before the due date;

determining an order of priority of the selected tasks based on both of (i) the navigation data and (ii) the temporal constraint of the context data associated with each of the selected tasks;

providing navigation information on the in-vehicle computing system for a first task of the selected tasks based on the determined order of priority; and communicating, to a mobile computing device, a plurality of status updates regarding a progress of completion of the first task.

17. The one or more non-transitory, machine readable media of claim 16, wherein communicating the status update comprises communicating a current location of a vehicle in which the in-vehicle computing system is incorporated to the mobile computing device.

18. The one or more non-transitory, machine readable media of claim 16, wherein communicating the status update comprises communicating an estimated time of arrival to a destination location to the mobile computing device.

19. The one or more non-transitory, machine readable media of claim 16, wherein communicating the status update comprises:

determining, with the in-vehicle computing system, that the first task is completed; and communicating that the first task is completed to the mobile computing device.

20. The one or more non-transitory, machine readable media of claim 19, wherein the first task comprises a rendezvous with a user of a second mobile computing device, and wherein determining that the first task is completed comprises:

communicating with the second mobile computing device to determine a location of the second mobile computing device; and verifying that the location of the second mobile computing device is within a reference proximity to the in-vehicle computing system.

21. The one or more non-transitory, machine readable media of claim 19, wherein determining that the first task is completed comprises:

determining a current location of a vehicle in which the in-vehicle computing system is included; and verifying that the current location of the vehicle is equal to a destination location associated with the first task.

22. The one or more non-transitory, machine readable media of claim 19, wherein determining that the first task is completed comprises receiving confirmation of a credit card purchase.

23. The one or more non-transitory, machine readable media of claim 19, wherein determining that the first task is completed comprises receiving sensor data from a sensor of the vehicle that a passenger seat is occupied.

24. The one or more non-transitory, machine readable media of claim 16, wherein the first task comprises meeting a user of a mobile computing device, and further comprising:

communicating with the mobile computing device using the in-vehicle computing system to determine a current location of the user of the mobile computing device; and determining a destination location based on the current location of the user of the mobile computing device, the navigation data and the context data.

* * * * *